(12) United States Patent
Smith et al.

(10) Patent No.: US 9,417,819 B2
(45) Date of Patent: Aug. 16, 2016

(54) CACHE DEVICE FOR HARD DISK DRIVES AND METHODS OF OPERATIONS

(71) Applicant: OCZ Storage Solutions, Inc., San Jose, CA (US)

(72) Inventors: Stephen Jeffrey Smith, Morgan Hill, CA (US); Franz Michael Schuette, Colorado Springs, CO (US)

(73) Assignee: Toshiba, Corporation, Tokyo (JP)

( * ) Notice: Subject to any disclaimer, the term of this patent is extended or adjusted under 35 U.S.C. 154(b) by 307 days.

(21) Appl. No.: 14/079,192

(22) Filed: Nov. 13, 2013

(65) Prior Publication Data
US 2014/0136766 A1    May 15, 2014

Related U.S. Application Data

(60) Provisional application No. 61/725,658, filed on Nov. 13, 2012.

(51) Int. Cl.
*G06F 12/08* (2016.01)
*G06F 3/06* (2006.01)
*G11B 20/10* (2006.01)

(52) U.S. Cl.
CPC ............ *G06F 3/0679* (2013.01); *G06F 3/0626* (2013.01); *G06F 3/0658* (2013.01); *G06F 3/0676* (2013.01); *G06F 3/0656* (2013.01); *G11B 20/10527* (2013.01)

(58) Field of Classification Search
CPC ... G06F 3/0679; G06F 3/0626; G06F 3/0658; G06F 3/0676

USPC .............. 711/103, 118, 154, 156; 365/185.33
See application file for complete search history.

(56) References Cited

U.S. PATENT DOCUMENTS

| | | | | |
|---|---|---|---|---|
| 6,746,255 B1* | 6/2004 | Lee | .................. | H01R 13/65807 439/108 |
| 6,781,826 B1* | 8/2004 | Goldstone | ............ | G11B 25/043 360/75 |
| 6,843,674 B1* | 1/2005 | Young | ................ | H01R 13/6315 439/248 |
| 7,134,908 B2* | 11/2006 | Wu | ........................ | H01R 25/00 439/502 |
| 7,552,289 B2* | 6/2009 | Hoch | .................... | G06F 1/3221 710/107 |
| 7,554,855 B2* | 6/2009 | Kim | .................... | G11C 14/0018 365/185.11 |
| 8,161,227 B1* | 4/2012 | Diggs | ................... | G06F 3/0626 365/185.14 |
| 8,195,878 B2 | 6/2012 | Mittendorff et al. | | |
| 8,645,626 B2 | 2/2014 | Mittendorff et al. | | |
| 2013/0311696 A1* | 11/2013 | Huff | ...................... | G06F 13/385 710/316 |

* cited by examiner

*Primary Examiner* — Stephen Elmore
(74) *Attorney, Agent, or Firm* — White & Case LLP

(57) ABSTRACT

A solid-state mass storage device adapted to be used as a cache for an hard disk drive that utilizes a more efficient logical data management method relative to conventional systems. The storage device includes a circuit board, a memory controller, at least one non-volatile memory device, and at least two data interfaces. The storage device is coupled to a host computer system and configured to operate as a cache for at least one hard disk drive. The storage device is interposed between the host computer system and the at least one hard disk drive. Both the storage device and the at least one hard disk drive are coupled to the host computer system through a single connection and configured to operate in a daisy chain configuration.

20 Claims, 15 Drawing Sheets

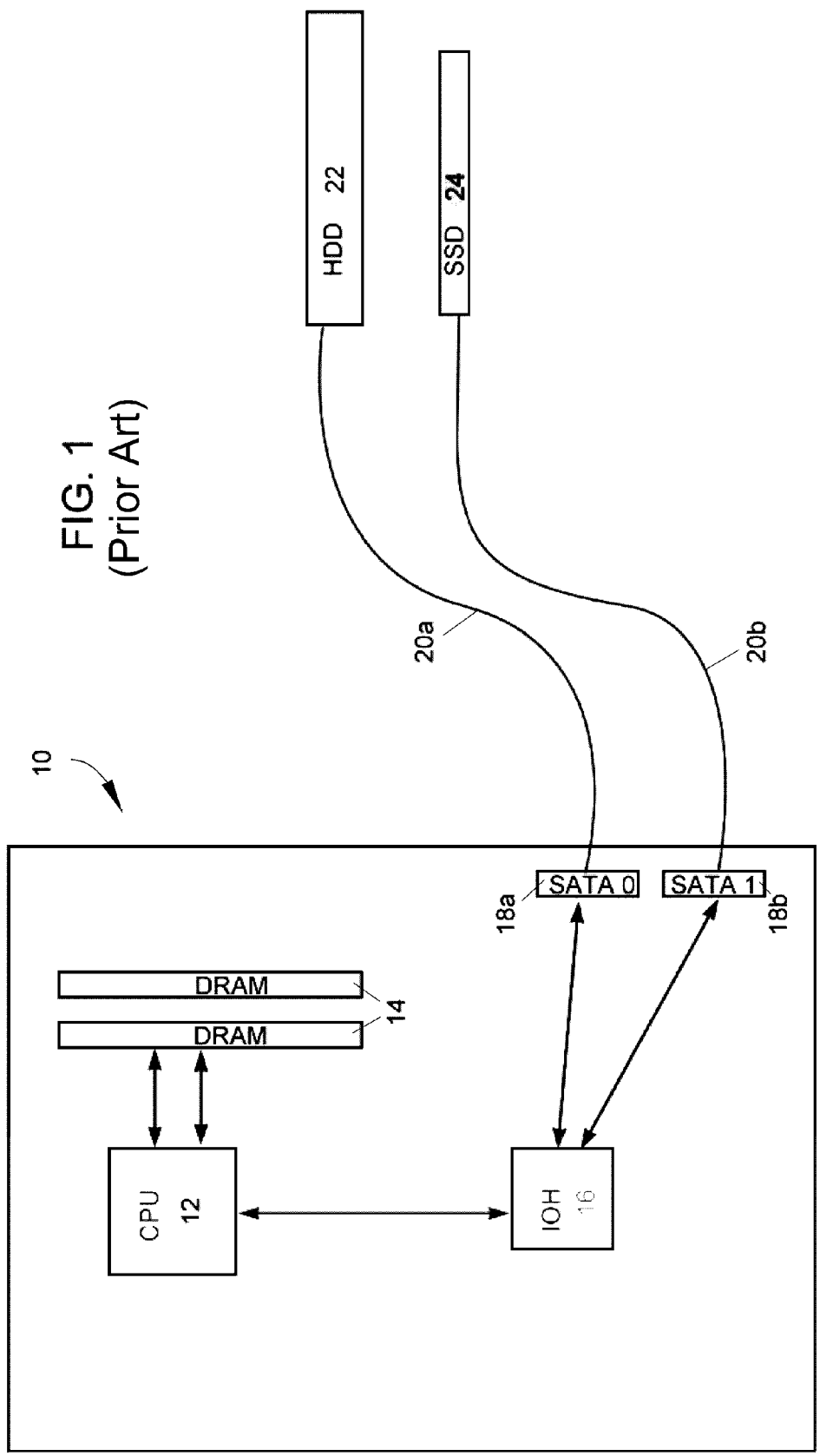

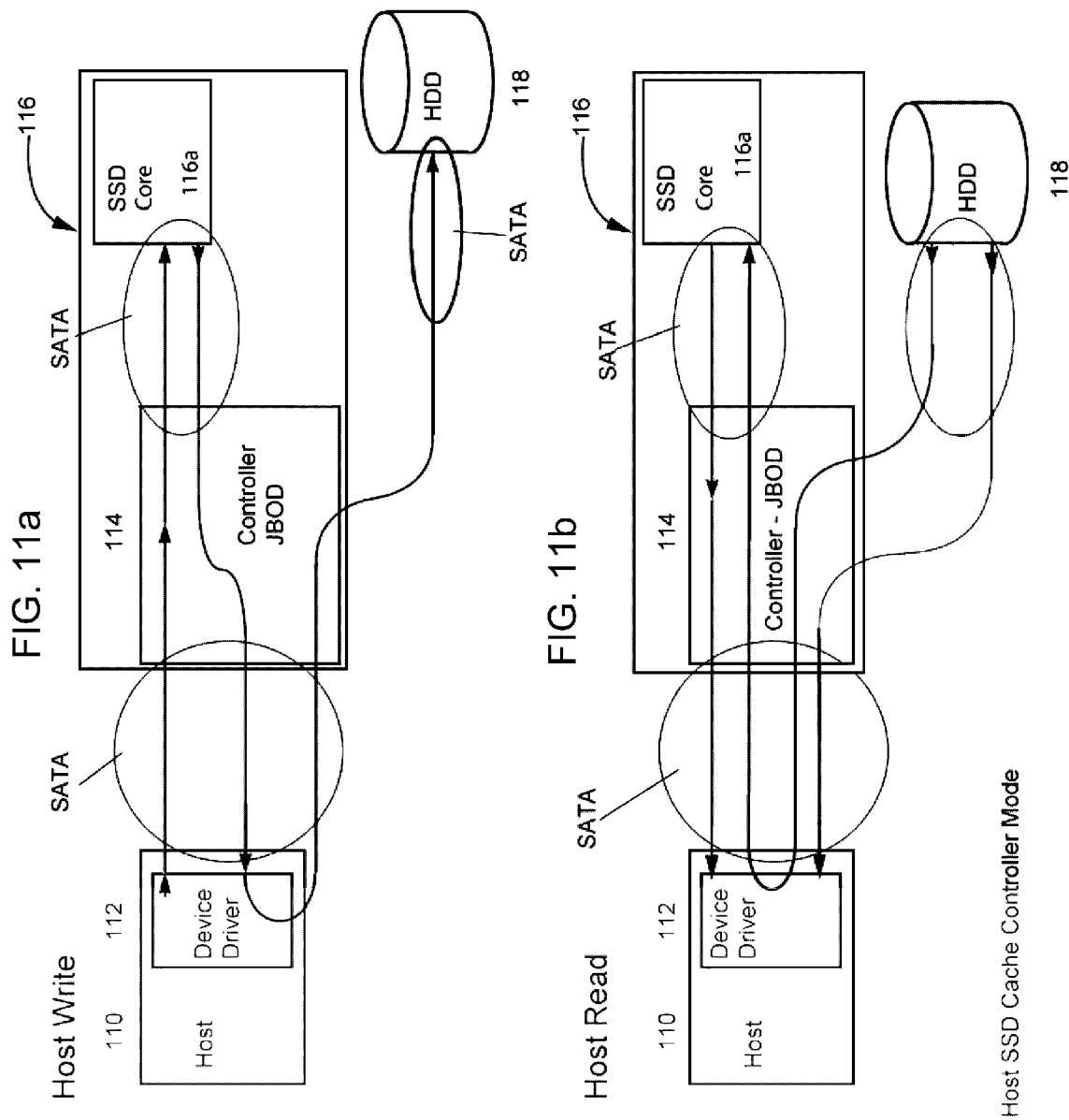

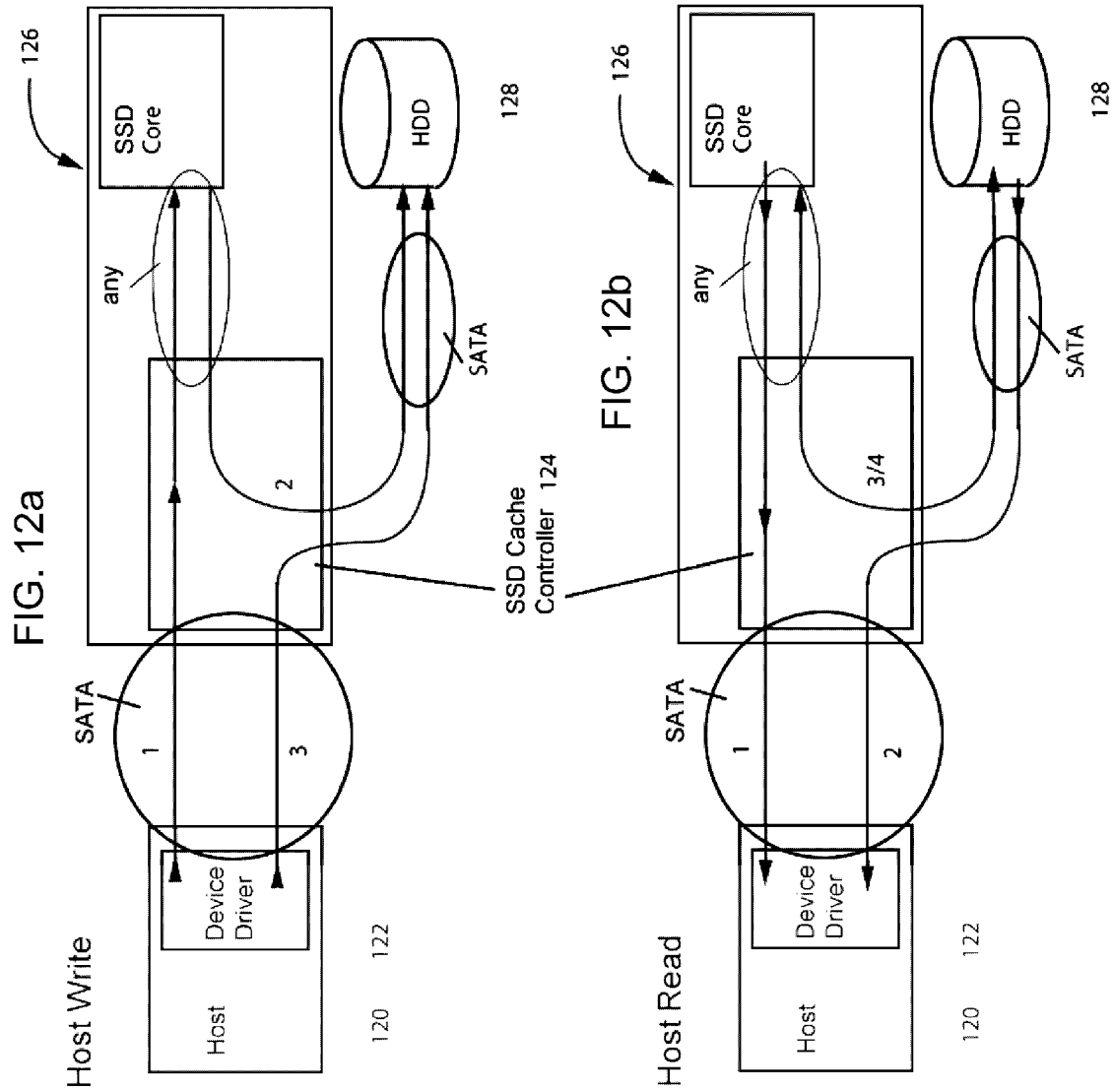

CACHE DEVICE FOR HARD DISK DRIVES AND METHODS OF OPERATIONS

CROSS REFERENCE TO RELATED APPLICATIONS

This application claims the benefit of U.S. Provisional Application No. 61/725,658, filed Nov. 13, 2012, the contents of which are incorporated herein by reference.

BACKGROUND OF THE INVENTION

The present invention generally relates to memory devices for use with computers and other processing apparatuses. More particularly, this invention relates to non-volatile mass storage devices configured for use as a cache for a system comprising conventional hard disk drive storage.

Compared to solid-state drives, conventional hard disk drives are still the media of choice with respect to cost per Byte. In addition, hard disk drives have practically unlimited data retention whereas all present solid-state drives are non-volatile storage devices, however, data retention is limited to a few months with current NAND flash geometries, and further declining with future process nodes. The price disparity that is still prevailing even after NAND flash production has exceeded that of all other memory devices combined, along with the lack of long term data retention has redefined the primary role of solid-state drives from a replacement of hard disk drives to become a complementing storage device, primarily to service random access patterns of relatively small but frequently accessed data sets.

This type of device is generally considered a cache, and management of data between the hard disk drive as main storage and the solid-state drives as cache is done by one or the other form of hierarchical storage management (HSM). In most cases, HSM uses access frequency of logical block addresses or similar algorithms to determine which data are kept on the faster but smaller solid-state drives and which data are committed to the slower but larger hard disk drive.

Most current physical implementations use a dedicated solid-state drives on its own serial advanced technology attachment (SATA) or other system interface port in addition to the port used to connect the hard disk drive. Both drives use standard SATA cabling for power delivery and exchange of data with the host system. Alternatively, integrated hybrid devices combining both rotatable media and solid state technology are available in the form of peripheral component interconnect express (PCIe) expansion cards. These devices are hard-wired internally, meaning that they don't require extra cables. However, they follow the same logic configuration in that a host bus adapter is integrated onto the card and each storage device is coupled to its own dedicated port.

According to the above, current solid-state drives-based cache solutions have at least two shortcomings. First, in the case of conventional SATA drives, the installation of a cache drive requires additional cabling and mounting of hardware. Secondly, both configurations share the drawback of shuffling the data through several steps, for example, from the hard disk drive to the host bus adapter and via a direct memory access (DMA) channel to the system memory and then finally back to the solid-state drives. In short, the physical implementation of existing cache solid-state drives is cumbersome and the data flow is far from optimal, adding the potential problem of bus contention and increased latencies because of interrupts on several levels of the system. Both issues underscore the need to develop more streamlined and more flexible solutions.

In view of the above, it can be appreciated that there are certain problems, shortcomings or disadvantages associated with the prior art, and that it would be desirable if improved cache solid-state drives systems were available utilizing more efficient data management methods.

BRIEF DESCRIPTION OF THE INVENTION

The present invention provides solid-state mass storage devices adapted to be used as a cache for an hard disk drive that utilize a more efficient logical data management method relative to conventional systems.

According to a first aspect of the invention, a solid-state mass storage device includes a circuit board, a memory controller, at least one non-volatile memory device, and at least two data interfaces. The mass storage device is coupled to a host computer system and configured to operate as a cache for at least one hard disk drive. The mass storage device is interposed between the host computer system and the at least one hard disk drive. Both the mass storage device and the at least one hard disk drive are coupled to the host computer system through a single connection and configured to operate in a daisy chain configuration.

According to a second aspect of the invention, a solid-state mass storage device includes a circuit board, a memory controller, at least one non-volatile memory device, and at least two data interfaces. A first of the at least two data interfaces is adapted to functionally couple to a host computer system and a second of the at least two data interfaces is adapted to functionally couple to a hard disk drive. The mass storage device is adapted to be interposed between the host computer system and the hard disk drive, operate as a cache for the hard disk drive, and provide functional coupling between the hard disk drive and the host computer system.

A technical effect of the invention is the ability to provide solid-state caching to a hard disk drive with fewer cables and more efficient data caching. In particular, it is believed that, by interposing the solid-state drive between the host computer system and the hard disk drive, the system will need fewer connecting cables and data may be cached with reduced shuffling within the system.

Other aspects and advantages of this invention will be better appreciated from the following detailed description.

BRIEF DESCRIPTION OF THE DRAWINGS

FIG. 1 is a block diagram representing a conventional computer system comprising a hard disk drive and a solid state drive wherein the solid state drive is used as a cache drive.

FIGS. 11a and 11b are block diagrams representing data paths of a hybrid system wherein a host controls the cache controller mode in accordance with an aspect of the invention.

FIGS. 12a and 12b are block diagrams representing a simple hybrid drive mode with logical block address based partitioning of the hybrid space using a solid state drive either in transparent append mode or in non-transparent insert mode, respectively, in accordance with an aspect of the invention.

DETAILED DESCRIPTION OF THE INVENTION

Figure 2A:
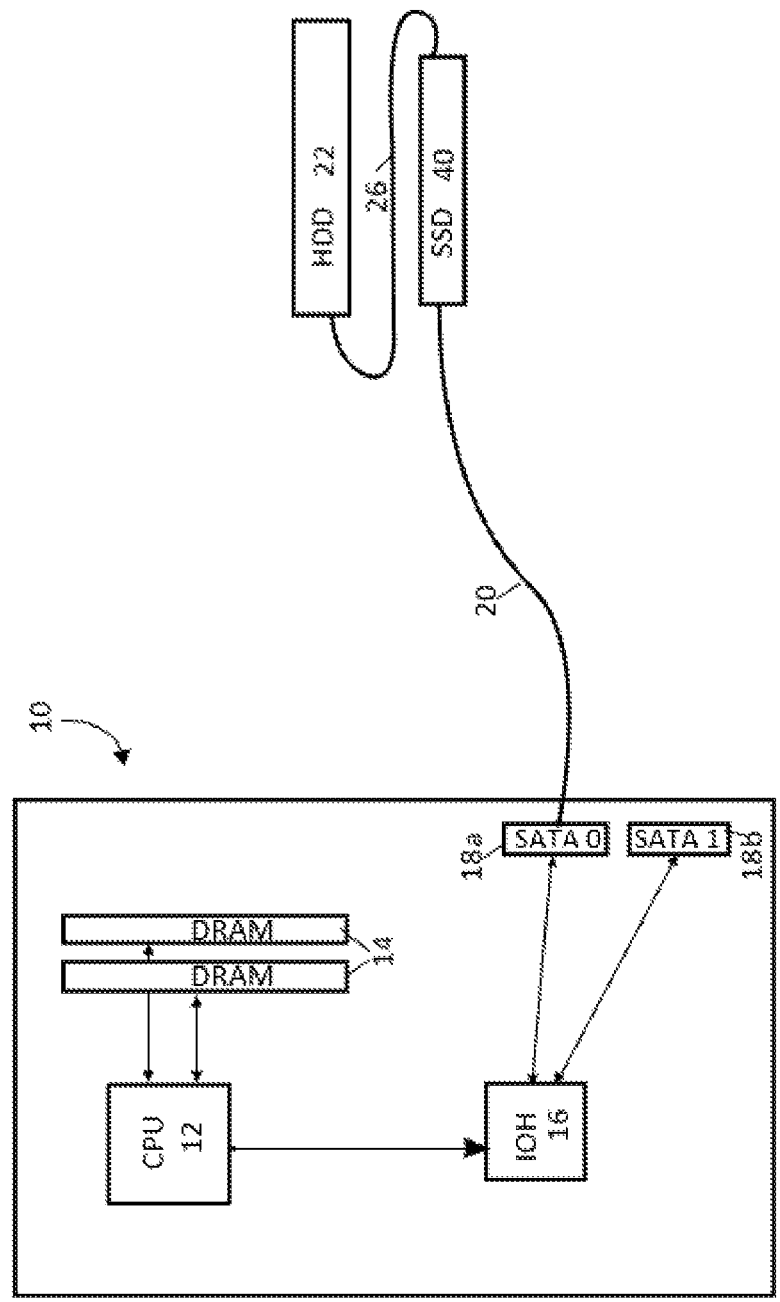
FIGS. 2a and 2b are block diagrams representing the computer system of FIG. 1, with the hard disk drive and the solid state drive configured as daisy-chained devices on a single SATA cable in accordance with an aspect of the invention.

The present invention discloses a solid-state mass storage device (solid-state drive) to be used as cache with a conventional serial ATA (SATA) hard disk drive by interposing the solid-state drive between a host computer system and the hard disk drive as a cache device, wherein the solid-state drive is configured to operate in a daisy chain configuration with the hard disk drive. For convenience, consistent reference numbers are used throughout the drawings to identify the same or functionally equivalent elements.

FIG. 1 represents a conventional system-level implementation of a cache solid-state drive as known in the art. A motherboard (or functionally equivalent circuitry) of, for example, a host computer system 10 features a central processing unit (CPU) 12, system memory 14, and an I/O control hub 16 coupled to at least two SATA connectors 18a and 18b. Each SATA connector is connected to a SATA cable 20a and 20b, one of which connects to a conventional hard disk drive 22 and the other one to a conventional cache solid-state drive 24.

In contrast to the above discussed prior art, the present invention comprises a cache solid-state drive 40 interposed between the host computer system 10 (and, in particular, its motherboard or equivalent) and the hard disk drive 22 through a cable 20 connected to the host computer system 10 as shown in FIG. 2. The solid-state drive 40 can be configured to act as read ahead cache and/or as a write cache for the hard disk drive 22, thereby greatly increasing a speed of transfers between the hard disk drive 22 and the host computer system 10 in both read and write transactions. Access of either drive 40 and 22 can be selected on the basis of hierarchical storage management (HSM) algorithms or other parameters, nonlimiting examples of which include command or frame information structure (FIS) based switching of a SATA port multiplier.

Figure 2B:
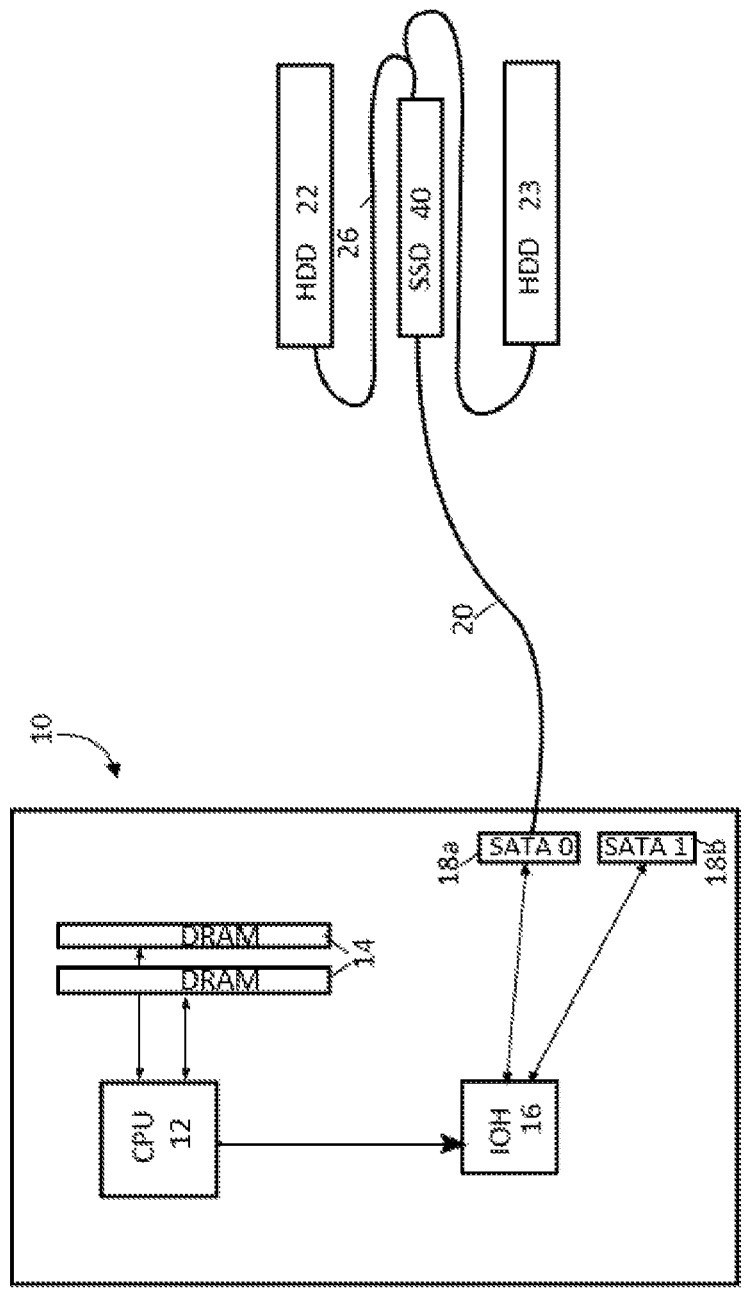
Figure 3:
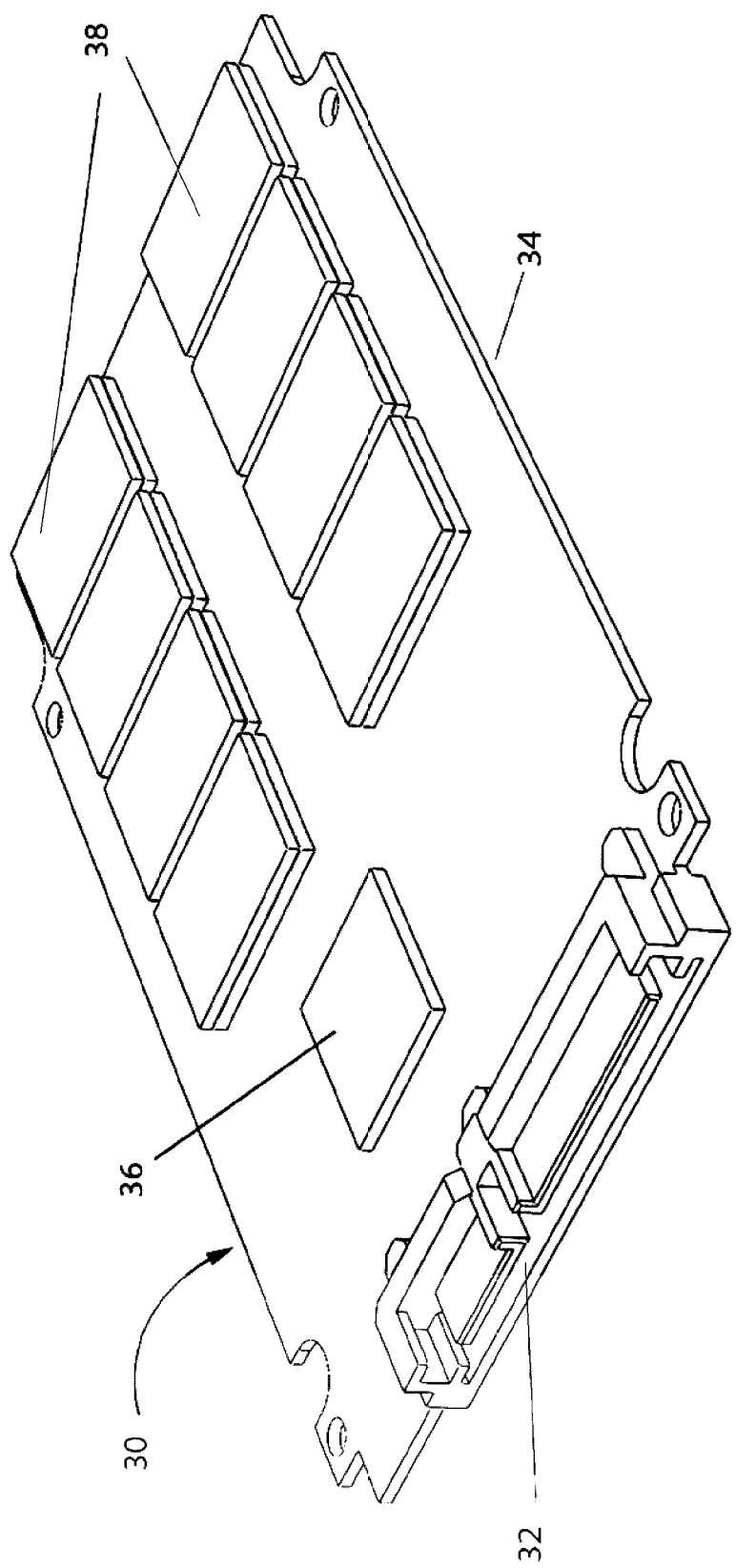
FIG. 3 is a perspective view representing a circuit board of a conventional solid state drive comprising a male connector adapted to receive data and power from a host system.
Figure 4:
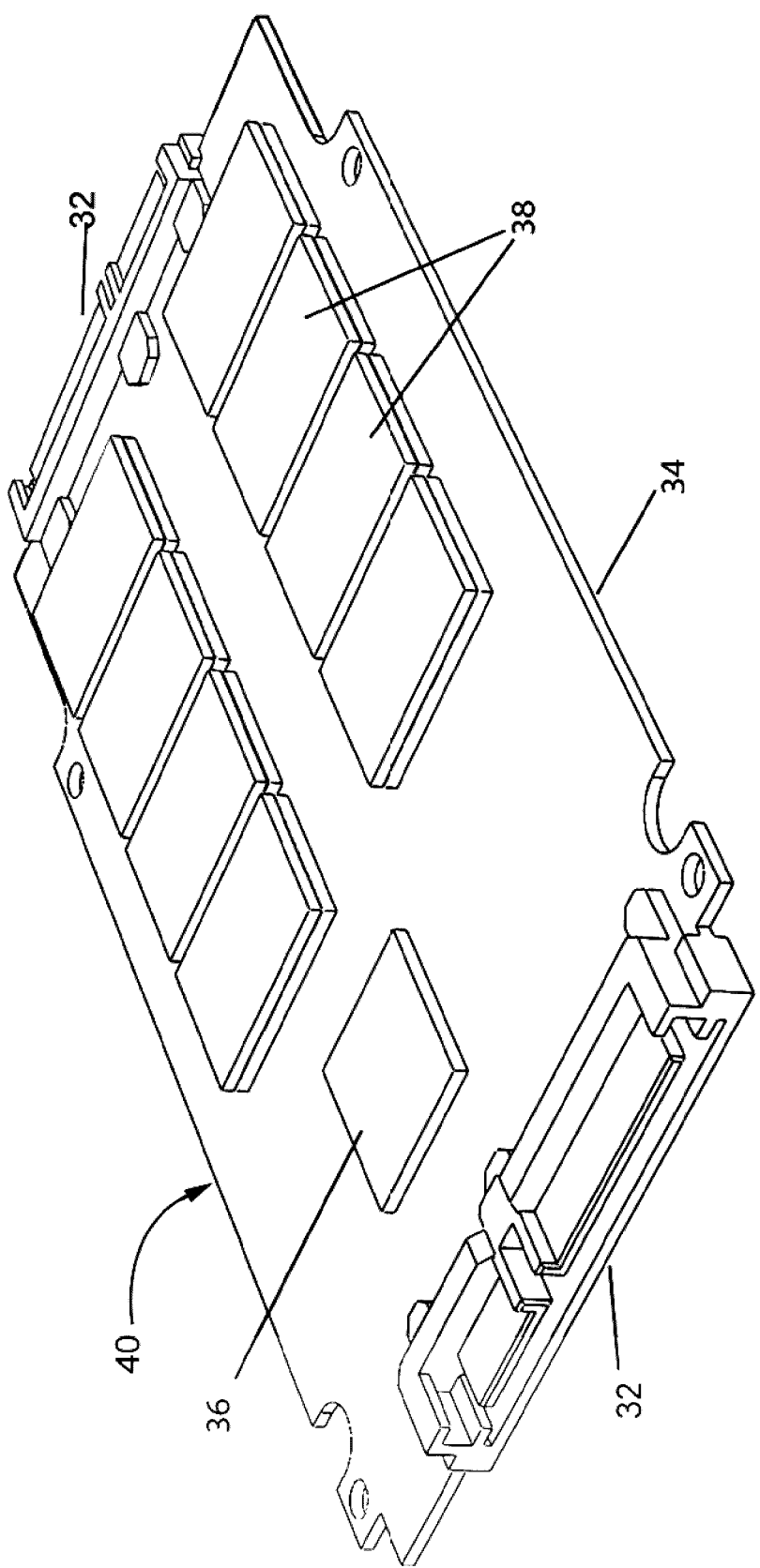
FIG. 4 is a perspective view representing an solid state drive comprising two male SATA and power connectors in accordance with an aspect of the invention.

As represented in FIG. 2a, one exemplary aspect of the invention uses the single cable 20 to connect to a port (not shown) on the solid-state drive 40, and the drive 40 comprises a second port (not shown) through which the drive 40 is functionally coupled to the hard disk drive 22 with a secondary cable 26. FIG. 2b illustrates the system of FIG. 2a, but comprising a secondary cable 26 with a second female connector that may be used to functionally couple drive 40 with a second hard disk drive 23. FIG. 3 represents a circuit board 34 of a conventional solid-state drive 30 as practiced in the art, with a composite data and power connector 32 to interface with a host computer system (for example, the system 10 and its motherboard of FIG. 2a). The circuit board 34 comprises a controller 36 and solid-state memory components 38, for example, NAND flash memory components. According to an aspect of the invention, FIG. 4 represents a dual-ported solid-state drive 40 structurally similar to the conventional solid-state drive 30 of FIG. 3 (for example, a circuit board 34 comprising a controller 36 and solid-state memory components 38), but configured to comprise two male connectors 32 for power and data transfer. A first of the male connectors 32 may interface with a host computer system (for example, the system 10 of FIG. 2a) and a second of the male connectors 32 may provide connectivity to a hard disk drive, for example, the hard disk drive 22 of FIG. 2a. Connection of the solid-state drive 40 to the host computer system 10 and from the solid-state drive 40 to the hard disk drive 22 is established using conventional SATA power and data cables (power and signal lines) with female connectors on each end. Power may be supplied to the solid-state drive 40 via a 3.3V or a 5V rail within the SATA power and data cables and a 12V rail is passed through from the first male connector 32 to the second male connector 32 to directly power the hard disk drive 22. Arbitration between the actual solid-state drive 40 and the hard disk drive 22 may be accomplished using dedicated logic discussed in more detail below.

Figure 5:
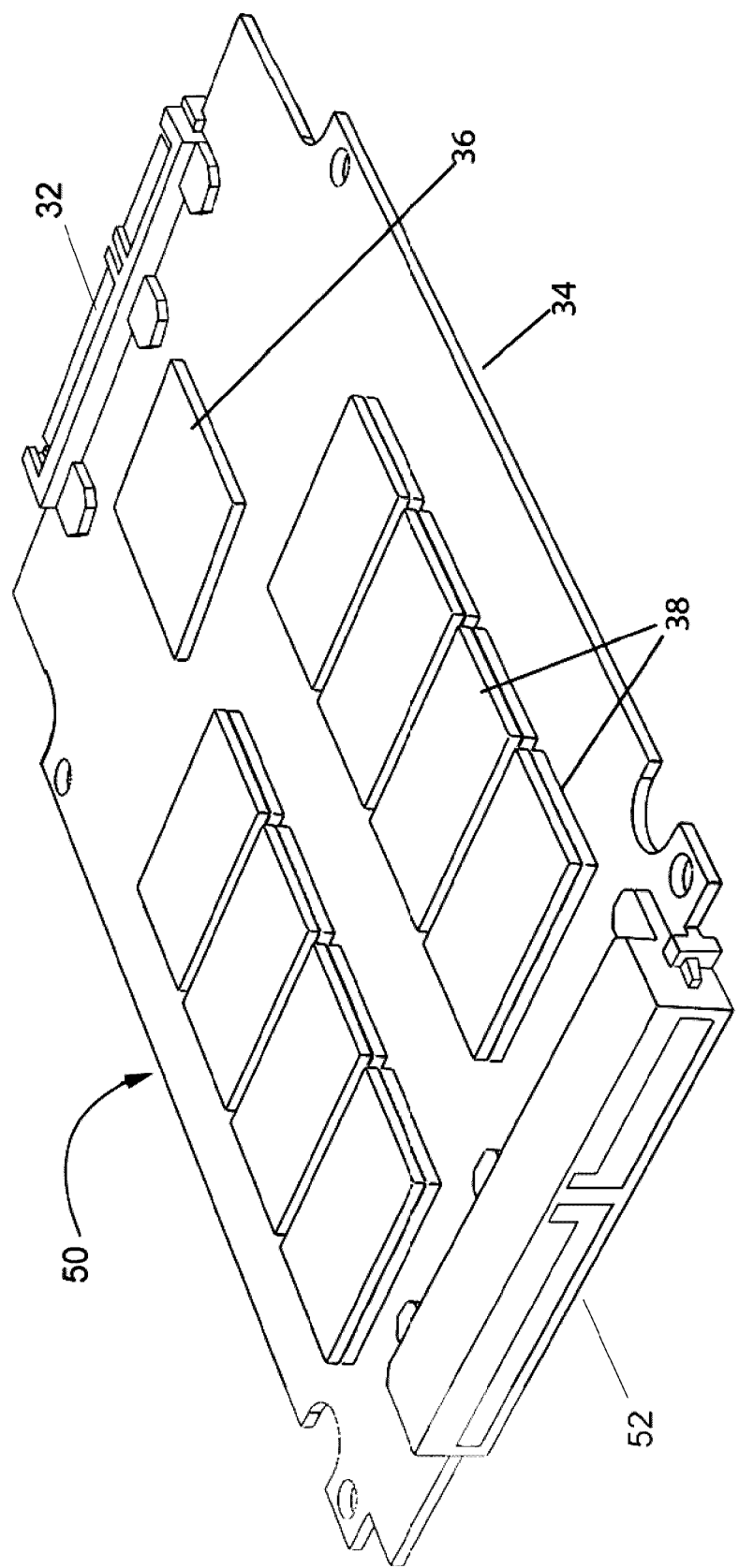
FIG. 5 is a perspective view representing a solid state drive comprising a male SATA and power connector and a female SATA and power connector in accordance with an aspect of the invention.

FIG. 5 represents a preferred cache solid-state drive 50 configured so that the first male connector 32 (hereinafter designated as a host interface connector 32) establishes a data and power connection with the host computer system 10, and a female composite connector 52 is adapted to directly mate with the hard disk drive 22 or a specialized pass-through cable (not illustrated), having both male and female SATA data connectors as well as optional power connectors, wherein the female composite connector 52 is configured to directly mate with a male connector on the hard disk drive 22. Power to the solid-state drive 50 is preferably derived from the 3.3V or the 5V rail, whereas the 12V rail is passed through between the host interface connector 32 and the female composite connector 52 to exclusively power the hard disk drive 22. Alternatively, if the hard disk drive 22 uses one of the lower voltage rails, the power may be shared between the hard disk drive 22 and the solid-state drive 50 wherein the solid-state drive 50 still passes power through to the hard disk drive 22. As discussed in more detail with regard to FIG. 2C, the SATA cables may additionally comprise one or more additional male or female connectors in order to functionally couple more than one hard disk drive to the solid-state drive 50.

Figure 6A:
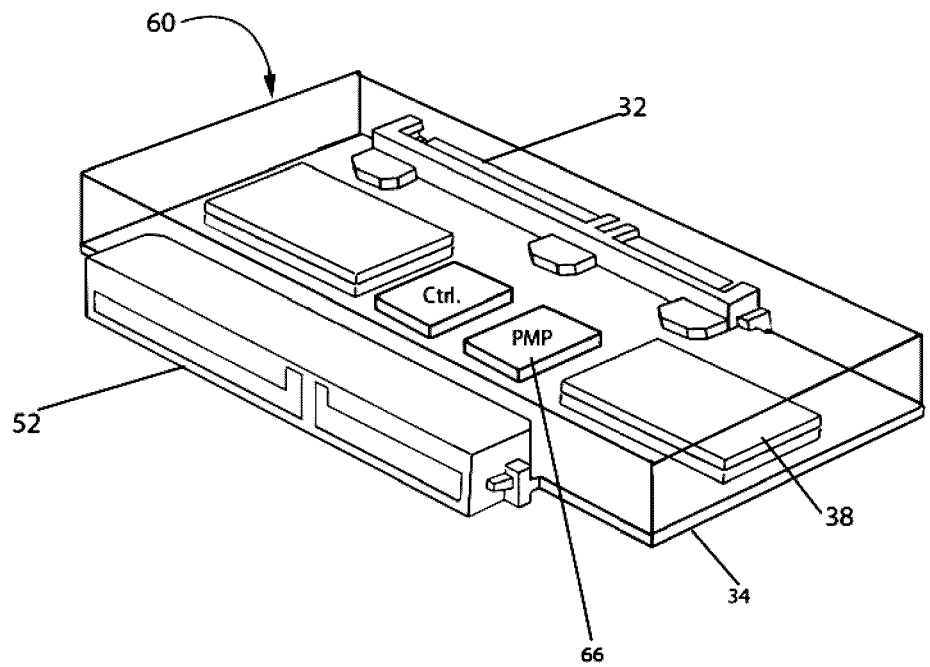
FIGS. 6a and 6b are perspective and block views representing a compact, dongle-type solid state drive adapted to be interposed between a hard disk drive and a host system in accordance with an aspect of the invention. The solid state drive comprises a female connector adapted to be coupled to the hard disk drive, a male connector adapted to be coupled to a single data and power cable from a host computer, and a port multiplier port (PMP) coupled to both of these connectors.

FIG. 6a represents a preferred structural embodiment of an ultra-compact solid-state drive 60 equipped with a female composite connector 52 configured as a hard disk drive interface connector 52 to directly couple with a male connector of the hard disk drive 22. It is believed that the compact structure provides an improved ease of installation and further eliminates the need for the secondary cable 26.

Figure 6B:
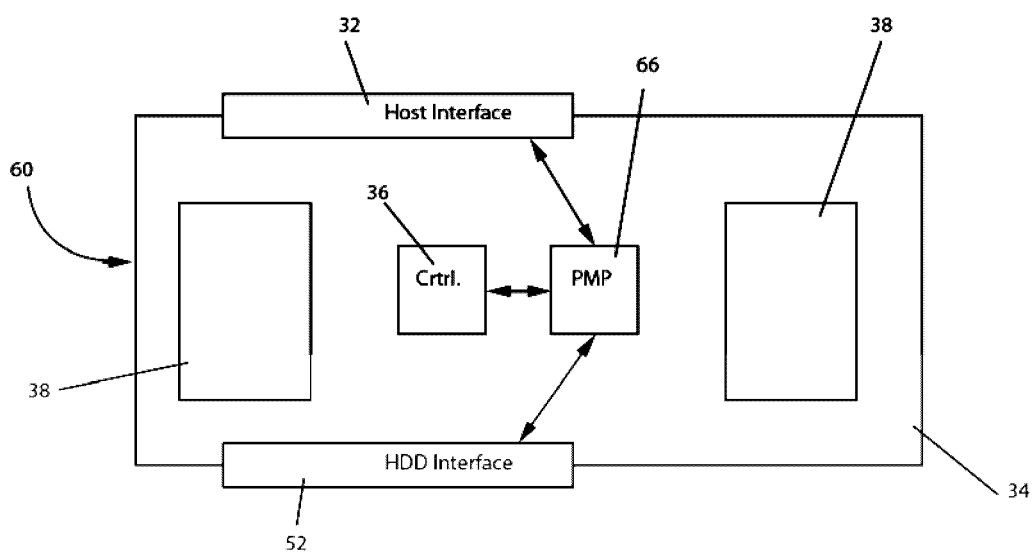

FIG. 6b represents an exemplary internal architecture wherein the host interface connector 32 is coupled to a port multiplier port (PMP) 66 which, in turn is coupled via a first port to the solid-state drive controller 36 and via a second port to the hard disk drive interface connector 52 adapted to mate with the hard disk drive 22. The specific implementation of the PMP 66 is discussed in more detail below.

Figure 7A:
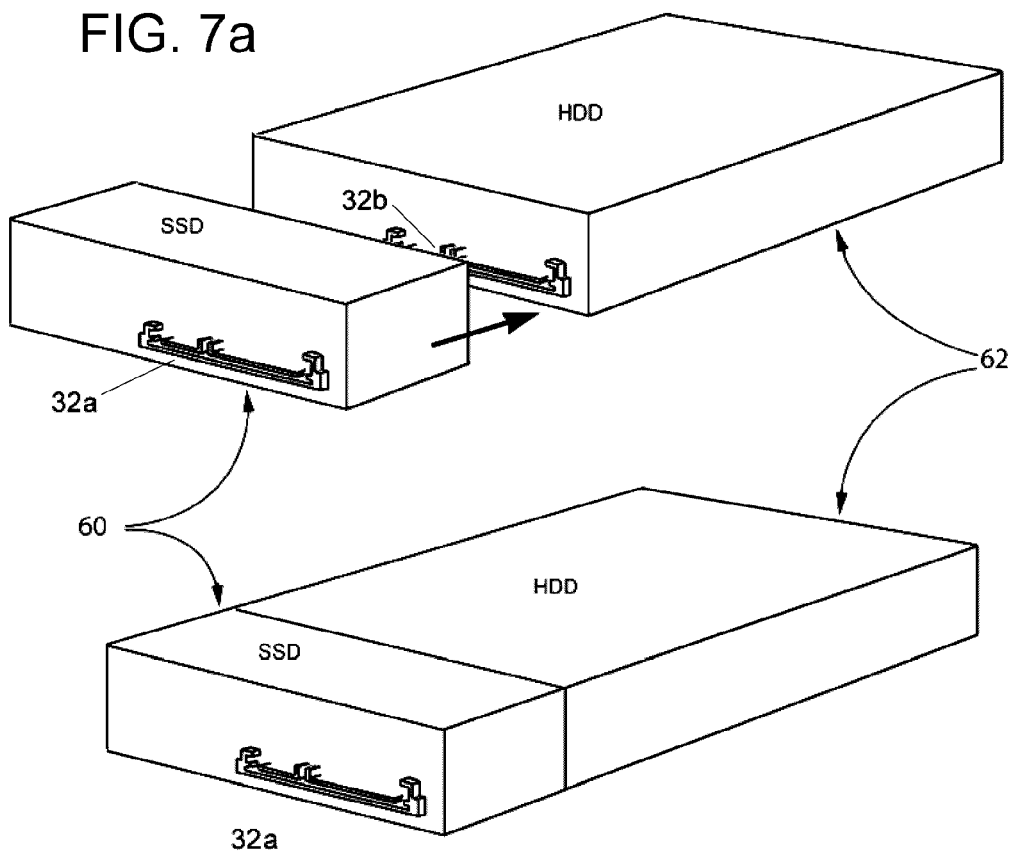
FIG. 7a is a perspective view representing a method of coupling the dongle-type solid state drive of FIGS. 6a and 6b to an existing hard disk drive in accordance with an aspect of the invention.
Figure 7B:
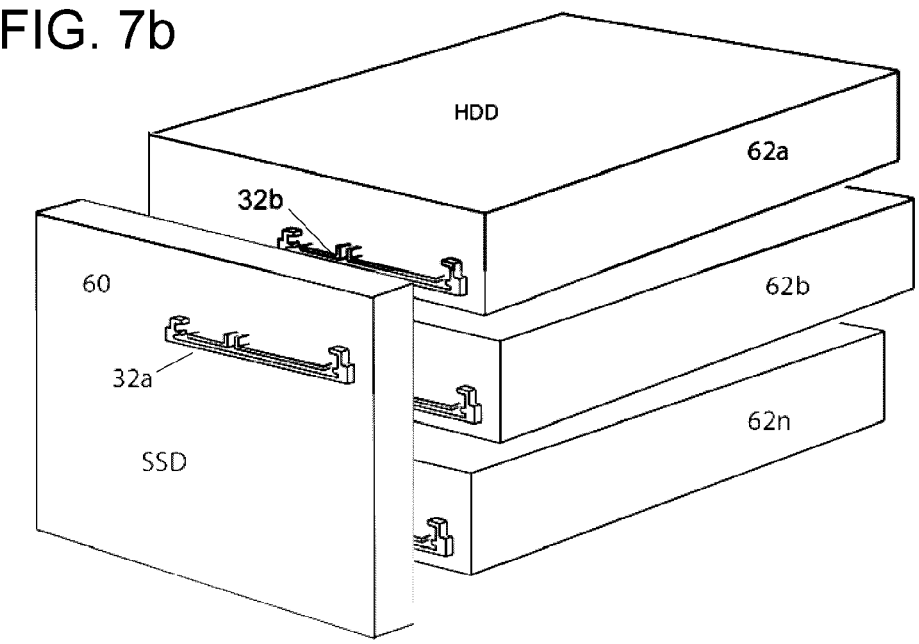
FIGS. 7b and 7c are perspective views representing a method of coupling a multi-ported dongle-type solid state drive, adapted to function as a combined port multiplier and unified cache, to several hard disk drives in accordance with an aspect of the invention.
Figure 7C:
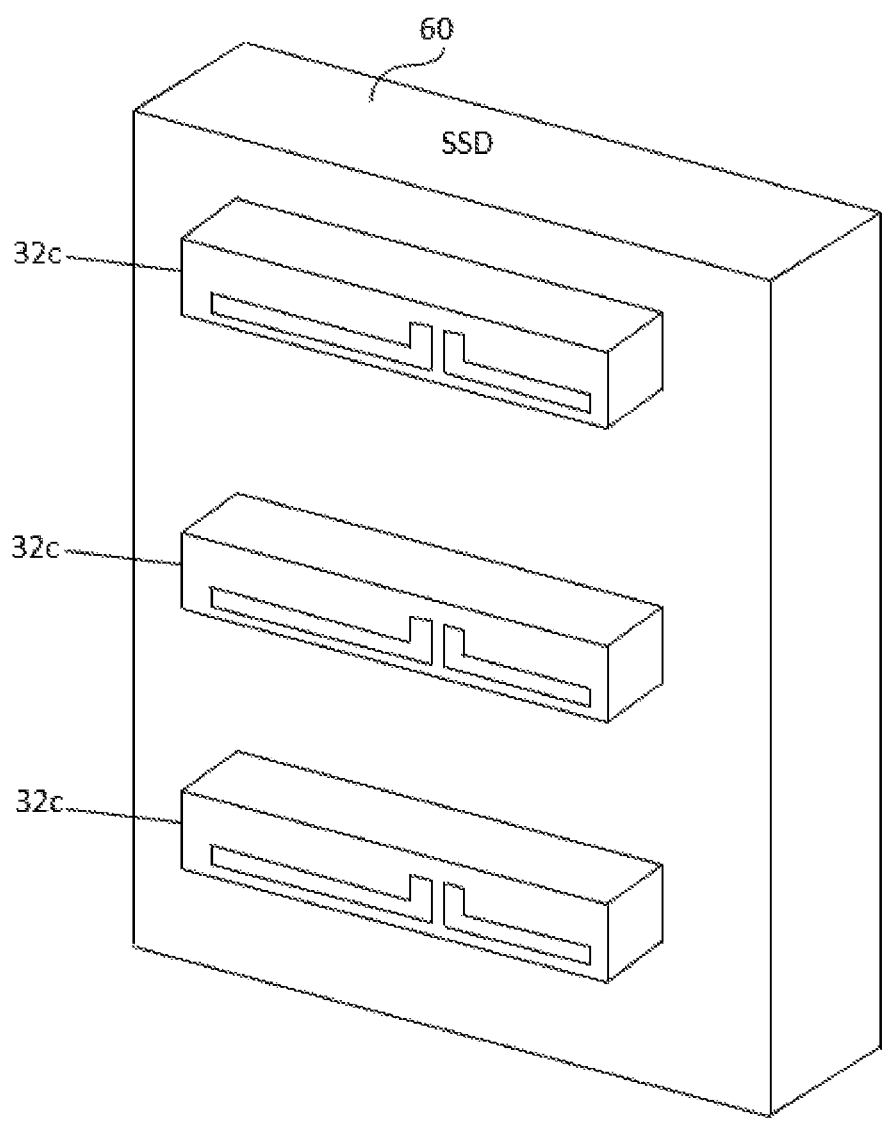

This docking or dongle configuration is further illustrated in FIG. 7a wherein the solid-state drive 60 is directly attached to a conventional hard disk drive 62 by mating of a female connector of the solid-state drive 60 with a host interface connector 32b of the hard disk drive 62, leaving a host interface connector 32a of the solid-state drive 60 as the unified system interface for both devices. In an additional aspect of this configuration shown in FIG. 7b, additional channels are added to accommodate several hard disk drives 62a through 62n whereby the solid-state drive 60 is configured as a unified cache for all hard disk drives 62a through 62n attached to the solid-state drive 60. FIG. 7c illustrates another view of solid-state drive 60 having female connectors 32c that are configured to mate with host interface connectors 32b of each hard disk drives 62a through 62n.

Parallel ATA uses a master/slave configuration, thereby allowing two drives to be attached to the same channel or cable. In contrast, Serial ATA (SATA) uses a point to point protocol in which each target device is directly connected to a dedicated SATA port. This may pose certain limitations to the logical implementation of the present invention, specifically for having several devices on a single channel.

Figure 8:
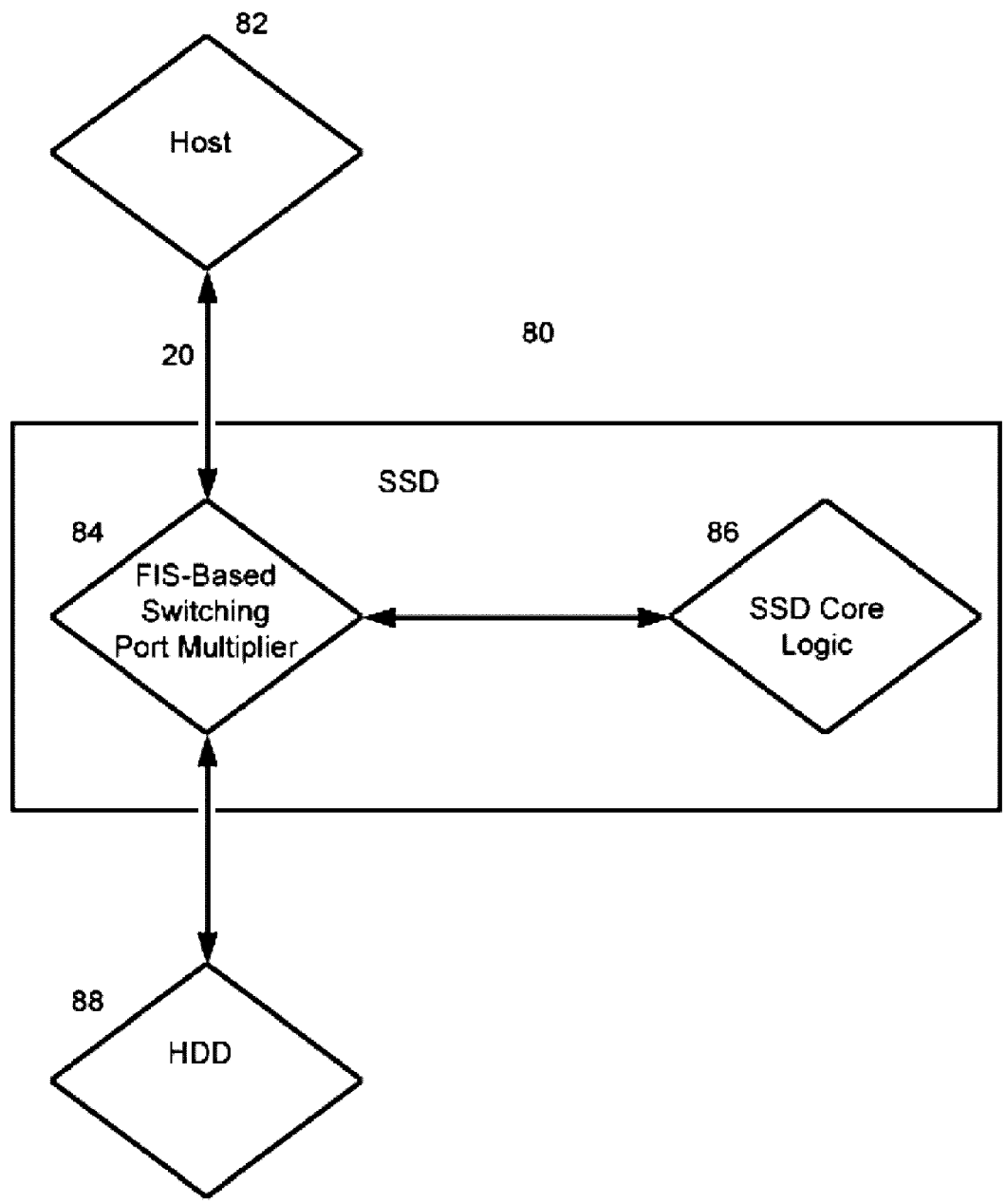
FIG. 8 is a flow diagram representing an overview of logic associated with a solid state drive comprising an integrated port multiplier port coupled to core logic of both a hard disk drive and the solid state drive in accordance with an aspect of the invention.

As illustrated in FIG. 8, one aspect of the invention that addresses this limitation is the integration of a SATA port multiplier port (PMP) 84 configured to split one port into up to fifteen or more sub-ports in a solid-state drive 80 in order to split the incoming I/O path over at least two daughter ports. According to this aspect of the invention, the PMP 84 provides two target channels, a hard disk drive 88 is connected to a first channel, and the solid-state drive core logic 86 comprising, for example, a flash translation layer and a multi-channel NAND flash controller is connected to a second channel. The PMP 84 is adapted to arbitrate packet signals between the solid-state drive and the hard disk drive. It is believed that more devices may be added, for example, several hard disk drives to a single, unified cache back-plane. However, for convenience the following discussion is limited to a two-channel configuration.

All data traffic is handled through an intelligent cache handler and in general, two different approaches are possible, namely software (running on the host) or hardware-based (running on the solid-state drive) cache management. According to a software-based cache management approach, the caching and, by extension, the addressing is performed in software, that is, a host computer system 82 becomes the intelligent cache controller and all caching functionality can be executed by the host in software. However, this solution uses host CPU cycles and incurs higher latencies than hardware-based implementation of an intelligent cache controller. Given the high latencies of a conventional hard disk drive as part of the combined storage device, the extra latencies may not be a significant factor for performance. An aspect of this implementation is to use specific instructions of the host CPU architecture, for example, streaming single instruction, multiple data extensions (SSE) to complement the software execution.

For more efficient operation of the drives behind the PMP 84, especially for taking advantage of native command queuing, and coping with the imbalance of traffic to a fast solid-state drive 80 and a relatively slow hard disk drive 88, a frame information structure (FIS) based switching PMP 84 is a particular solution over a command-based switching port multiplier port. In this case, the host 82 can issue commands to send and receive packets to and from any drive at any time. A balancing algorithm may ensure a fair allocation of available bandwidth to each drive, which is of particular importance in an asymmetric drive configuration, that is, the combination of the hard disk drive 88 and the solid-state drive 80. FIS-based switching also has an advantage over command-based switching by allowing the aggregated saturation of the host link and not interfering with native command queuing. The two different devices, that is, the solid-state drive 80 and the hard disk drive 88 may be selected on the basis of logical block address assignment within the combined hybrid storage device.

Figure 9:
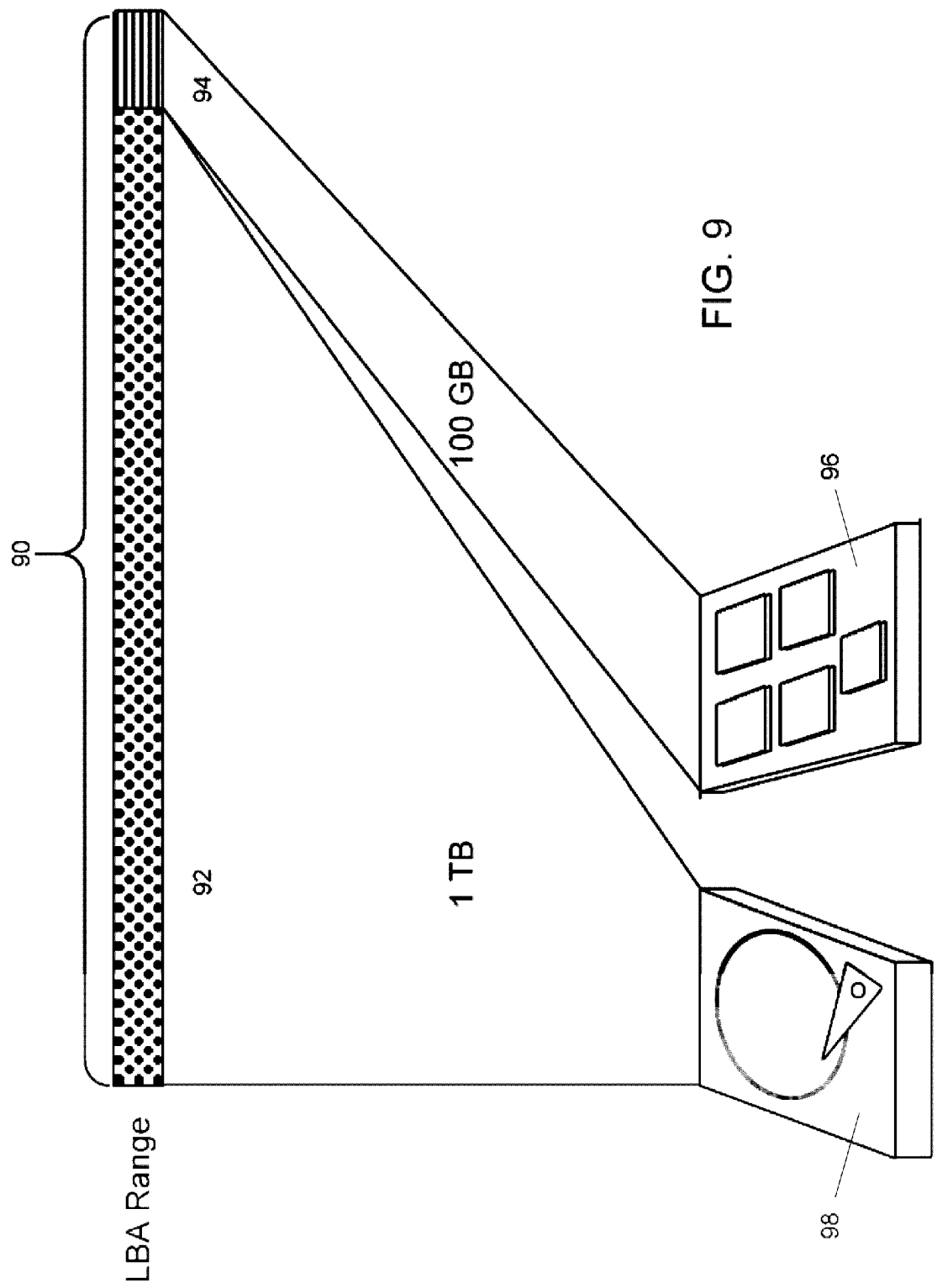
FIG. 9 represents a logical block address based partitioning of the combined space of a hard disk drive and a solid state drive comprising appended solid state drive logical block addresses for complete transparency to a host in accordance with an aspect of the invention.

In some applications, the cache solid-state drive will be added to an existing system installation on a pre-existing hard disk drive having a defined range of logical block addresses. Shown in FIG. 9 is an example of the combined logical block address range 90 comprising the hard disk drive's logical address block range 92 and the add-on solid-state drive logical block address range 94 in an asymmetric capacity based on an exemplary one TB hard disk drive 98 and a 100 GB solid-state drive 96.

Figure 10A:
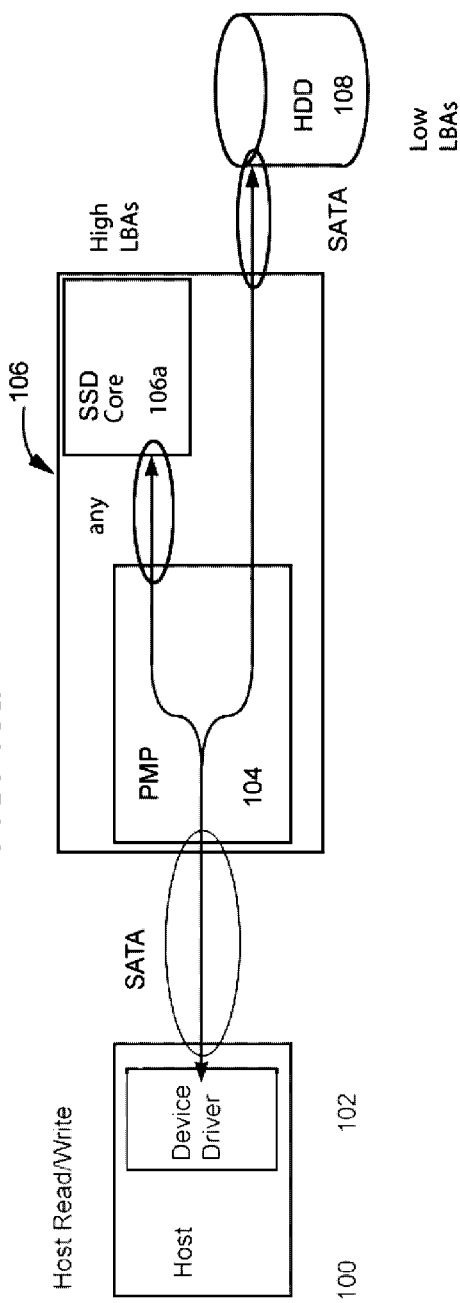
FIGS. 10a and 10b are block diagrams representing data paths of a hybrid system comprising solid state drive based caching using an intelligent solid state drive cache controller mode in accordance with an aspect of the invention.

FIG. 10a represents data paths when the solid-state drive 106 is added to an existing installation. The host 100 uses a device driver 102 to communicate with a port multiplier port (PMP) 104 via the SATA protocol. The PMP 104, which is integrated into a solid-state drive 106, splits the host SATA link into two channels to access a solid-state drive core 106a and a hard disk drive 108. However, the link to the solid-state drive core 106a is not restricted to using the SATA protocol, instead, any suitable protocol supported by the NAND flash controller, that is, solid-state drive core 106a of the solid-state drive 106 and the PMP 104 can be used.

If the new address range added by the solid-state drive 106 is appended to the top of the hard disk drive logical block address range (that is, the solid-state drive 106 is configured to comprise an upper logical block address range and the hard disk drive 108 is configured to comprise a lower logical block address range), the solid-state drive 106 can simply be treated as an extension or extended partition of the hard disk drive 108. This embodiment has the advantage of being completely transparent to the host computer system 100. That is, when the solid-state drive cache module containing the PMP 104 and the solid-state drive 106 is connected for the first time, all data on the hard disk drive 108 remain completely intact. Also, appending the new logical block address range eliminates the need to migrate data to the solid-state drive 106 because the intelligent solid-state drive cache controller, which may be part of the device driver 102 can handle this on the next set of I/Os from the host 100 and start building the cache.

Figure 10B:
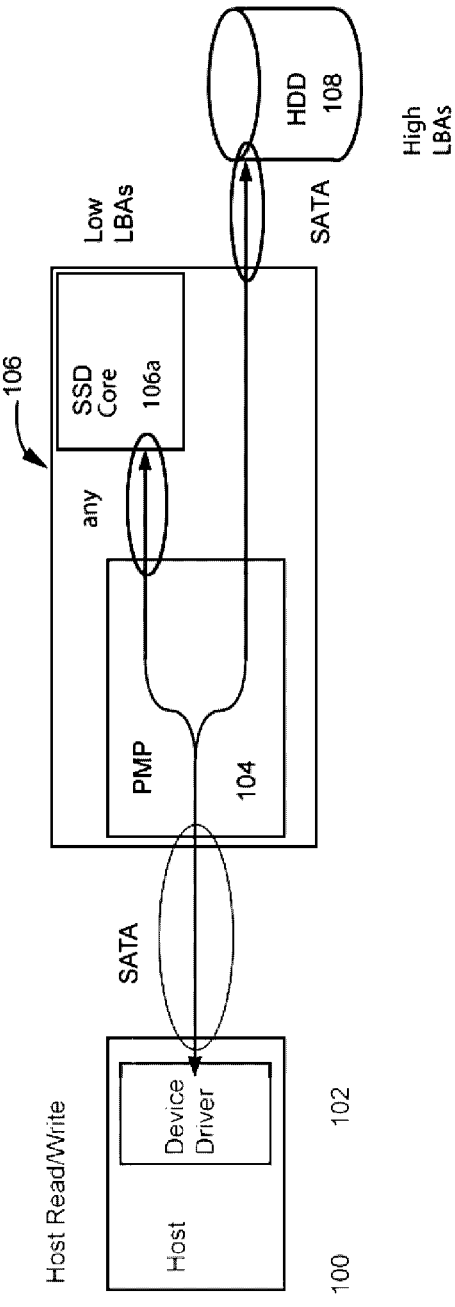

Another embodiment preferred for installation in a newly assembled system is represented in FIG. 10b wherein the solid-state drive cache is inserted into the existing logical block address range at the lower logical block addresses. In this embodiment, the intelligent solid-state drive cache controller employs a drive concatenation mode with the solid-state drive utilizing the lower logical block addresses and the hard disk drive utilizing the remaining logical block addresses of the combined drive.

FIGS. 11a and 11b represent data flow in a host-controlled solid-state drive cache 116 implementation across the different elements using a SATA interface for both the solid-state drive core 116a and the hard disk drive 118 and which can be considered a specialized form of just a bunch of drives (JBOD) over a PMP 114. The device driver 112 running on the host computer system 110 controls the host-based solid-state drive cache controller.

On a host write, represented in FIG. 11a, packets containing command, address, and data are routed directly to the solid-state drive cache 116 and from there, are transferred through lazy writes to the hard disk drive 118. Alternatively, the solid-state drive 116 may queue up the data and transfer them to the hard disk drive 118 at a transfer rate limit of the hard disk drive 118, which is typically dictated primarily by the internal media transfer rate of the hard disk drive 118, based on access latencies and linear data transfer rates based on zone characteristics.

Any read request issued by the host 110 will be checked against the solid-state drive cache 116 based on a logical block address lookup and, if the requested logical block address or set of logical block addresses is in the solid-state drive cache 116, then the read request may be serviced from the solid-state drive 116, minimizing the latency or seek time inherent to any access of the hard disk drive 118. If the read request specifies a logical block address or logical block address range not found in the solid-state drive 116, the intelligent solid-state drive cache controller residing within the device driver 112 may read the logical block addresses from the hard disk drive 118, write them to the solid-state drive 116, which thereby acts as cache of buffer and sends the data to the host 110. Given the access latencies of hard disk drives, this type of caching of data on request only incurs a minor increase in latency. In addition, an associated logical block address range may be speculatively pre-fetched from the hard disk drive 118 to the solid-state drive 116, for example, through a lazy read of coalesced read requests for file fragments.

Access selection of either the hard disk drive 118 or the solid-state drive core 116a may be performed using sniffing of logical block addresses. That is, the flash translation layer of the solid-state drive core 116a is aware of which logical block addresses are stored within the flash array and can also sniff the hard disk drive 118 for valid entries of the same logical block addresses. In case of an incomplete match of the logical block address range with the host read request, the data present in the solid-state drive 116 may be read and complemented by the missing logical block addresses that are read from the hard disk drive 118.

A slightly different mode of operation involves reading the data directly from the hard disk drive 118 without first duplicating them on the solid-state drive 116. In this case, access latencies are slightly reduced but in recurrent requests, no speed-up of the accesses is accomplished. Servicing the read request directly from the hard disk drive 118 also allows host level-based file defragmentation. Commonly, access of larger files will entail several read commands to individual file fragments, which increases overhead as well as access latencies. Even in the case of solid-state drives, it is advantageous to defragment the files by coalescing the fragments on the level of the host and writing them back as a logically contiguous file to the solid-state drive 116. The file system is updated to point to the new logical block address range in the solid-state drive 116 as the valid version of the file and the pointers to the file fragments on the hard disk drive 118 are invalidated. If the file is subsequently changed, it is written back to the solid-state drive 116 only. Once the file is resident on the solid-state drive 116, it is monitored with respect to its access frequency as an indicator of probability for additional recurrent accesses, that is, whether the data are hot or cold. A timer may be employed to decrease the "temperature" of the file, for example, as a function of interval since the last access. If the latter drops below a predetermined threshold, the file is written back to the hard disk drive 118 and purged from the solid-state drive cache 116. Writing the data back to the hard disk drive 118 may also be done speculatively in the form of lazy writes in the background during periods of low activity.

A hardware-based cache management method utilizes a dedicated microprocessor to execute the caching algorithms in hardware. This approach requires more hardware but offsets this disadvantage by handling all requests locally, thereby alleviating CPU utilization and conserving bandwidth between the host and the device. This solution may be particularly better suited than a software-based solution in a server environment.

As shown in FIGS. 12a and 12b, in this embodiment of the invention, the solid-state drive 126 comprises the intelligent cache controller 124 and the solid-state drive core controller 126a attached to the non-volatile storage array (not illustrated) and is adapted to autonomously manage data transfer between the hard disk drive 128 and the solid-state drive 126 as well as routing of direct access of data by the host 120 during a read or write request to either hard disk drive 128 or solid-state drive 126. A microcontroller, which is part of the intelligent cache controller, runs the logical block address sniffing to determine where on the combined device the data are found. The microcontroller is still controlled by the host's device driver 122 and may also handle the hierarchical storage management algorithms.

If a write request comes from the host 120, the solid-state drive 126 writes the data to its own non-volatile storage array but maintains the logical block addresses of the write command in a buffer and sets up a direct memory access (DMA) channel to start copying the data to the hard disk drive 128 using idle periods. The solid-state drive 126 is configured as a queue capable of buffering host writes and scheduling the commitment of data to the hard disk drive 128 as the hard disk drive's performance and internal media transfer rate allows, which includes rotational and seek latencies as well as linear, zone-dependent data rates. Through the solid-state drive cache controller 124 which is integrated into the solid-state drive 126, the solid-state drive 126 has internal intelligence to track outstanding writes in order to maintain as much coherency as possible between the solid-state drive 126 and the hard disk drive 128. Instead of immediately transferring the data to the hard disk drive 128 at the highest rate permissible by the hard disk drive's architecture, the solid-state drive 126 may also use lazy writes to transfer data to the hard disk drive. Lazy writes by the host, that is, writes deferred by the host computer system 120, may be written directly to the hard disk drive 128 in pass-through mode.

Read or Read-Ahead Caching of the hard disk drive 128 by the solid-state drive 126 works by using one of the various forms of hierarchical storage management (HSM) known in the art. On a read request from the host 120, the solid-state drive cache controller 124 checks whether the logical block addresses requested are present in the solid-state drive 126 and if that is the case, the request is serviced directly from the solid-state drive 126 (data path 1 in FIG. 12a). If the logical block addresses are not in the solid-state drive 126 but in the hard disk drive 128, the respective logical block addresses can be copied into the read-ahead cache including additional data that are logically coherent with those that are requested (data path 3 in FIG. 12*a*). In addition, speculative pre-fetching of data can be performed based on locality of the addresses on the hard disk drive 128 or based on history or other algorithms known in the art.

The solid-state drive may further contain a hardware-based access counter that can be logically connected to a timer, wherein all data within the solid-state drive's logical block address range are initially considered "hot" but cool off as a function over time if no additional access occurs. After the cooling of any given data has reached a threshold the data are written back to the hard disk drive (data path 4 in FIG. 12*b*) and then purged from the solid-state drive 126, which can be done since the original copy still resides on the hard disk drive 128. If the cached data were read-only and were not modified, they can be purged from the solid-state drive cache without writing them back to the hard disk drive 128.

Figure 13:
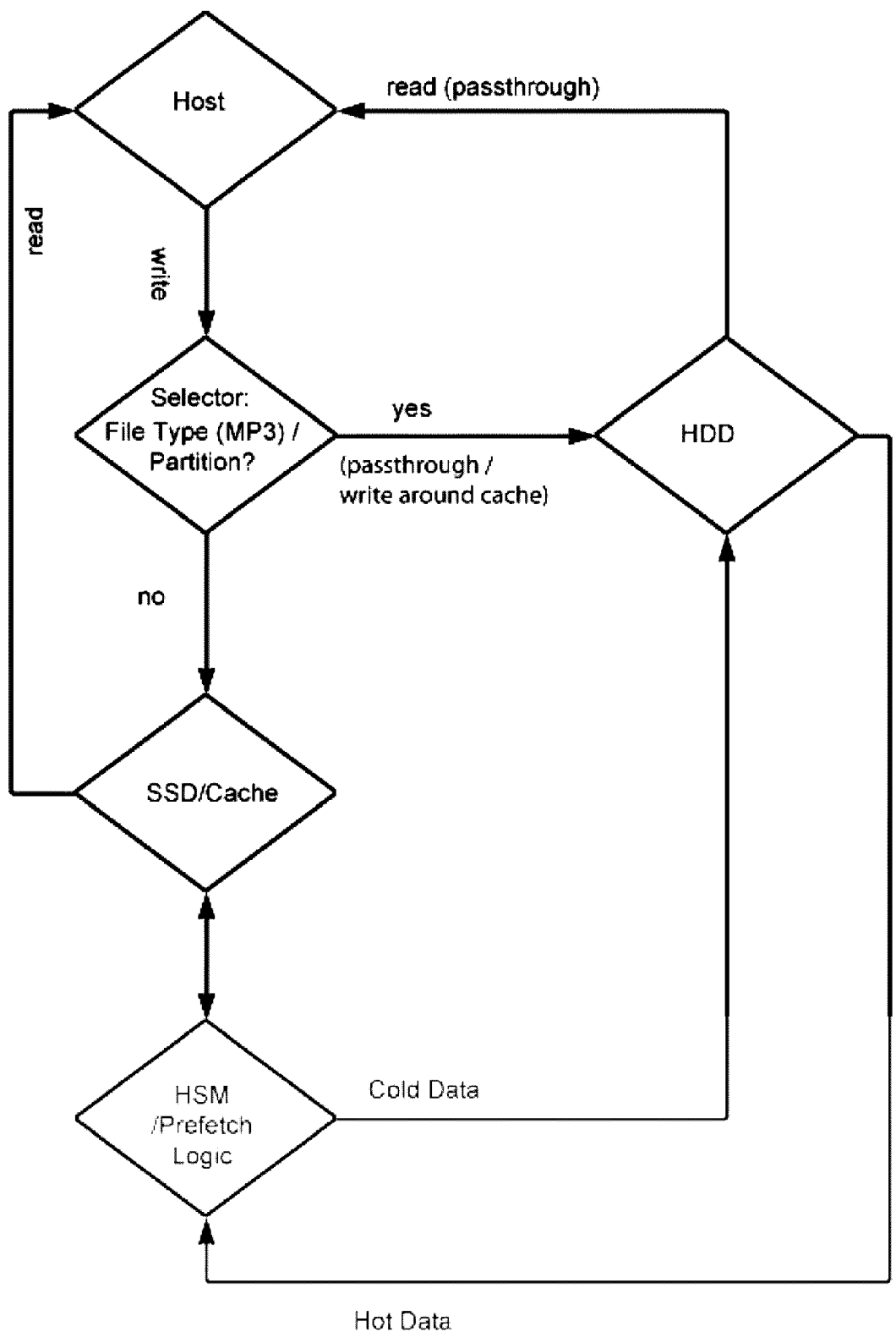
FIG. 13 is a flow diagram representing host accesses for different file types and partitions in cache or pass-through mode in accordance with an aspect of the invention.

In certain cases, it may not be opportune to use caching, rather it may be better to write data straight through to the hard disk drive in pass through or write-around-cache mode, for example, for back-up copies of files. A flow diagram of such a file-type-based cache management approach is represented in FIG. 13. Likewise, specific data patterns may be excluded from caching, for example uncompressible files like MPEG files that are already pre-compressed. This mode of operation can be further enhanced by partitioning the hard disk drive and then using the interposed solid-state drive cache only for one of the partitions on the hard disk drive. Alternatively, the solid-state drive or a part thereof as defined by an address range may be set up to be a partition of a hybrid drive that, from a hardware point of view, may appear unified to the system and host bus adapter (HBA). For example, the operating system may be stored on a partition or on a specific address range of the solid-state drive that is excluded from shadowing it to the hard disk drive.

While the invention has been described in terms of a specific embodiment, it is apparent that other forms could be adopted by one skilled in the art. For example, the physical configuration of the drive (or other solid-state mass storage device) could differ from that shown, and functionally-equivalent components could be used or subsequently developed to perform the intended functions of the disclosed components of the drive. Therefore, the scope of the invention is to be limited only by the following claims.

The invention claimed is:

1. A solid-state mass storage device comprising:
a circuit board;
a memory controller;
at least one non-volatile memory device; and
at least two data interfaces;
wherein the solid-state mass storage device is coupled to a host computer system and configured to operate as a cache for at least one hard disk drive, the solid-state mass storage device being interposed between the host computer system and the at least one hard disk drive;
wherein both the solid-state mass storage device and the at least one hard disk drive are coupled to the host computer system through a single connection, the solid-state mass storage device being configured to operate in a daisy chain configuration with the hard disk drive.

2. The solid-state mass storage device of claim 1, wherein the at least two data interfaces each comprise a male signal connector adapted to couple to a SATA cable comprising power and signal lines, a first SATA cable functionally coupling the solid-state mass storage device to the host computer system and a second SATA cable functionally coupling the solid-state mass storage device to the hard disk drive.

3. The solid-state mass storage device of claim 1, wherein a first of the at least two data interfaces comprises a male data and power connector configured to receive data and power from the host computer system and a second of the at least two data interfaces comprises a female data and power connector configured to functionally couple the solid-state mass storage device to the hard disk drive.

4. The solid-state mass storage device of claim 3, wherein the coupling between the solid-state mass storage device and the hard disk drive comprises a cable having a male connector on a first end and a female connector on a second end, wherein the female connector is configured to directly mate with a male connector of the hard disk drive.

5. The solid-state mass storage device of claim 4, wherein the cable comprises at least a second female connector configured to directly mate with a male connector of a second hard disk drive.

6. The solid-state mass storage device of claim 3, wherein the female data and power connector of the second data interface is configured to directly mate with a male connector of the hard disk drive.

7. The solid-state mass storage device of claim 6, further comprising at least a third data interface comprising a female data and power connector configured to directly mate and functionally couple with a male connector of a second hard disk drive.

8. The solid-state mass storage device of claim 3, wherein the solid-state mass storage device contains a port multiplier port to arbitrate between the memory controller and the hard disk drive.

9. The solid-state mass storage device of claim 8, wherein caching algorithms are executed by the host computer.

10. The solid-state mass storage device of claim 9, wherein the solid-state mass storage device is configured to comprise an upper logical block address range and the hard disk drive is configured to comprise a lower logical block address range.

11. The solid-state mass storage device of claim 9, wherein the solid-state mass storage device comprises a lower logical block address range and the hard disk drive comprises an upper logical block address range.

12. The solid-state mass storage device of claim 3, wherein the solid-state mass storage device comprises an intelligent cache manager adapted to execute caching based on hierarchical storage management algorithms.

13. A method for using the solid-state mass storage device of claim 1 as a cache in the host computer system, the method comprising:
functionally coupling a first of the two data interfaces of the solid-state mass storage device to the host computer system;
functionally coupling a second of the two interfaces to the hard disk drive; and
configuring the solid-state mass storage device to function as a cache for the at least one hard disk drive.

14. The method of claim 13, further comprising arbitrating packet signals between the memory controller and the second interface coupled to the hard disk drive with a port multiplier port on the solid-state mass storage device.

15. The method of claim 14, wherein the hard disk drive is configured to span a lower logical block address range and the solid-state mass storage device is configured to span an upper logical block address range.

16. The method of claim 14, wherein the hard disk drive is configured to span an upper logical block address range and the solid-state mass storage device is configured to span a lower logical block address range.

17. The method of claim 14, further comprising executing cache management in the host computer system.

18. The method of claim 13, further comprising executing caching algorithms with an intelligent cache handler in the solid-state mass storage device.

19. The method of claim 13, further comprising functionally coupling a third data interface on the solid-state mass storage device to a second hard disk drive.

20. A solid-state mass storage device comprising:
   a circuit board;
   a memory controller;
   at least one non-volatile memory device; and
   at least two data interfaces;
   wherein a first of the at least two data interfaces is adapted to functionally couple to a host computer system and a second of the at least two data interfaces is adapted to functionally couple to a hard disk drive,
   wherein the solid-state mass storage device is adapted to be interposed between the host computer system and the hard disk drive, operate as a cache for the hard disk drive, and provide functional coupling between the hard disk drive and the host computer system.

* * * * *